(12) United States Patent
Zhang

(10) Patent No.: US 8,756,189 B2
(45) Date of Patent: Jun. 17, 2014

(54) RULE GENERATION FOR EVENT PROCESSING SYSTEM

(75) Inventor: Xiaoming Zhang, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 13/285,232

(22) Filed: Oct. 31, 2011

(65) Prior Publication Data

US 2013/0110745 A1  May 2, 2013

(51) Int. Cl.
*G06N 5/02* (2006.01)
(52) U.S. Cl.
CPC ..................... *G06N 5/025* (2013.01)
USPC .......................................................... 706/47
(58) Field of Classification Search
None
See application file for complete search history.

(56) References Cited

U.S. PATENT DOCUMENTS

| | | | |
|---|---|---|---|
| 7,117,191 B2 * | 10/2006 | Gavan et al. .............. | 706/47 |
| 7,412,481 B2 | 8/2008 | Nicholls et al. | |
| 7,656,288 B2 | 2/2010 | Joslin et al. | |
| 2010/0153316 A1 | 6/2010 | Duffield et al. | |
| 2010/0161526 A1 | 6/2010 | Zhang et al. | |
| 2011/0029824 A1 | 2/2011 | Scholer et al. | |

OTHER PUBLICATIONS

IBM. "IBM SPSS Statistics." IBM Software Products. Pages printed Oct. 28, 2011. <http://www-01.ibm.com/software/analytics/spss/products/statistics/>.
IBM. "IBM—WebSphere Business Events Version 7.0—WebSphere Business Events—Software." Pages printed Oct. 27, 2011. <http://www-01.ibm.com/software/integration/wbe/>.
IBM. "WebSphere Decision Server-United Kingdom-English-Products." Pages printed Oct. 27, 2011. <http://www-142.ibm.com/software/products/gb/en/websdeciserv>.
IBM. "IBM—WebSphere ILOG JRules—WebSphere ILOG JRules—Software." Pages printed Oct. 27, 2011. <http://www.01.ibm.com/software/integration/business-rule-management/jrules/>.
Jing Lin. "Decision List Learners." Department of Computer Science, Vanderbilt University Nashville, TN, USA. Apr. 1, 1996. <http://www.vuse.vanderbilt.edu/~dfisher/linj/Thesis/root/node2.html>.
Qin et al. "A Rule-Based Classification Algorithm for Uncertain Data." IEEE 25th International Conference on Data Engineering, 2009, ICDE '09. pp. 1633-1640. Issue Date: Oct. 29, 2009-Apr. 2, 2009. IEEE Computer Society.
Wikipedia. "Decision theory—Wikipedia, the free encyclopedia." Page last modified Aug. 10, 2011. <http://en.wikipedia.org/wiki/Decision_theory>.
Wikipedia. "Expert system—Wikipedia, the free encyclopedia." Page last modified Aug. 10, 2011. <http://en.wikipedia.org/wiki/Expert_system>.

* cited by examiner

*Primary Examiner* — Alan Chen
(74) *Attorney, Agent, or Firm* — David J. Zwick; John Pivnichny

(57) ABSTRACT

A computer receives a plurality of input events, each input event comprising one or more factors. The computer processes each input event based on event processing rules that cause the computer to evaluate the one or more factors and assign each input event a Boolean output value. The computer generates an output event containing the one or more factors and the Boolean output value. The computer generates additional event processing rules based on output events for which the event processing rules caused the output events to have a false-negative or false-positive Boolean output value. The additional rules are then included in the event processing rules.

12 Claims, 6 Drawing Sheets

RULE GENERATION FOR EVENT PROCESSING SYSTEM

FIELD OF THE INVENTION

The present invention relates generally to event processing systems, and more particularly to generating event processing rules in such systems.

BACKGROUND

An event processing system (EPS) is a computer-based system that accepts input events derived from real-world events. The EPS processes the event data to detect patterns in the data based on a set of event processing rules. The EPS then produces output events that typically will have a direct or indirect effect on the real world to assist the EPS user in achieving a desired goal.

An event is something that happens in the real world. An event can occur in a business context, such as a sales figure, an order being shipped, or a financial transaction. Events can occur in other contexts as well. For example, an event could be some occurrence in an industrial process, such as a temperature rising above a threshold.

Event producers produce events when something of interest happens. For example, an event producer could be a temperature sensor, or business system that generates an output record of a sales figure, a financial transaction, or a warehouse shipment. Some kind of interface is often required to format the raw event data into a form usable for later processing. For example, raw data from a sensor may be formatted into a decimal value, and a timestamp and identifier added to the event.

Event processing services reside on a computer and accept input events from event producers. The input events are processed by the event processing services based on a set of rules, which typically include a condition rule statement and an action rule statement. Patterns are detected in the input events based on the condition rule statement, and an output event is generated based on the action rule statement. For example, a simple condition rule statement might look for a specific value provided in an input event from a specific event producer, and a simple action rule statement might report that the specific value was found.

If a pattern specified in a condition rule statement is found, the input event is assigned a classification or category. For example, if the specified pattern is detected, a condition rule value might be assigned the value "true." The action rule statement associated with the condition rule statement directs the event processing services to generate an output event. For example, an output event might be a simple notification that a condition has occurred, the output event might cause some direct change to an industrial process, or the output event might be a recommendation to take some specific business action based on the simultaneous occurrences of several real-world events.

Complex event processing consists of processing many different events from different input streams, often referred to as an event cloud. Typically, related input events are combined to form complex events, and the complex events are processed to detect patterns in the events based on, for example, event hierarchies, and relationships between events such as temporal, causality, and membership. Output events are then generated based on the patterns detected in the complex input events.

Event consumers receive the output events from the event processing services and perform tasks in reaction to the output events. An event consumer might be a valve actuator in an industrial process, a sales manager, or a service or application in a computer. Often, an interface is required to format the output event into a form usable by the event consumer.

The above model describes a general EPS model in which events are created by event producers, processed by event processing services, and acted upon by event consumers. A special case is where the event producer and the event consumer are the same entity. For example, if the EPS is applied to product sales, input events consisting of sales figures generated by retail customers buying the product might result in output events that recommend a certain product discount be applied to promote more sales. The retail customer receives and acts upon the product discount by buying more product. Here, the retail customer is both the event producer and the event consumer.

The above describes one model of an event processing system. Numerous models offering different terminology, having finer granularity of components, or different boundaries between EPS components are also in use.

SUMMARY

Embodiments of the present invention provide a system, method, and program product for processing events in an event processing system. A computer receives a plurality of input events, each input event comprising one or more factors. The computer processes each input event based on at least a first event processing rule wherein the at least first processing rule causes the computer to evaluate the one or more factors, and based on a result of the evaluation, assigns each of the plurality of input events a Boolean output value. The computer generates an output event containing the one or more factors and the Boolean output value. The computer generates additional event processing rules based on output events for which the at least first event processing rule caused the output events to have a false-negative or false-positive Boolean output value. The additional rules are then included in the at least first event processing rule.

In certain embodiments, the additional event processing rules comprise a pair of rules wherein one of the rules is derived from output events having a false-negative Boolean output value and the other rule is derived from output events having a false-positive Boolean output value. In other embodiments, the event processing rules are an ordered list by newest rule first, and the input events are assigned Boolean output values based on the first rule satisfied by the input event factors. In other embodiments, additional rules based on false-negative and false-positive output events are periodically generated.

DETAILED DESCRIPTION

Embodiments of the present invention will now be described in detail with reference to the accompanying drawings.

Figure 1:
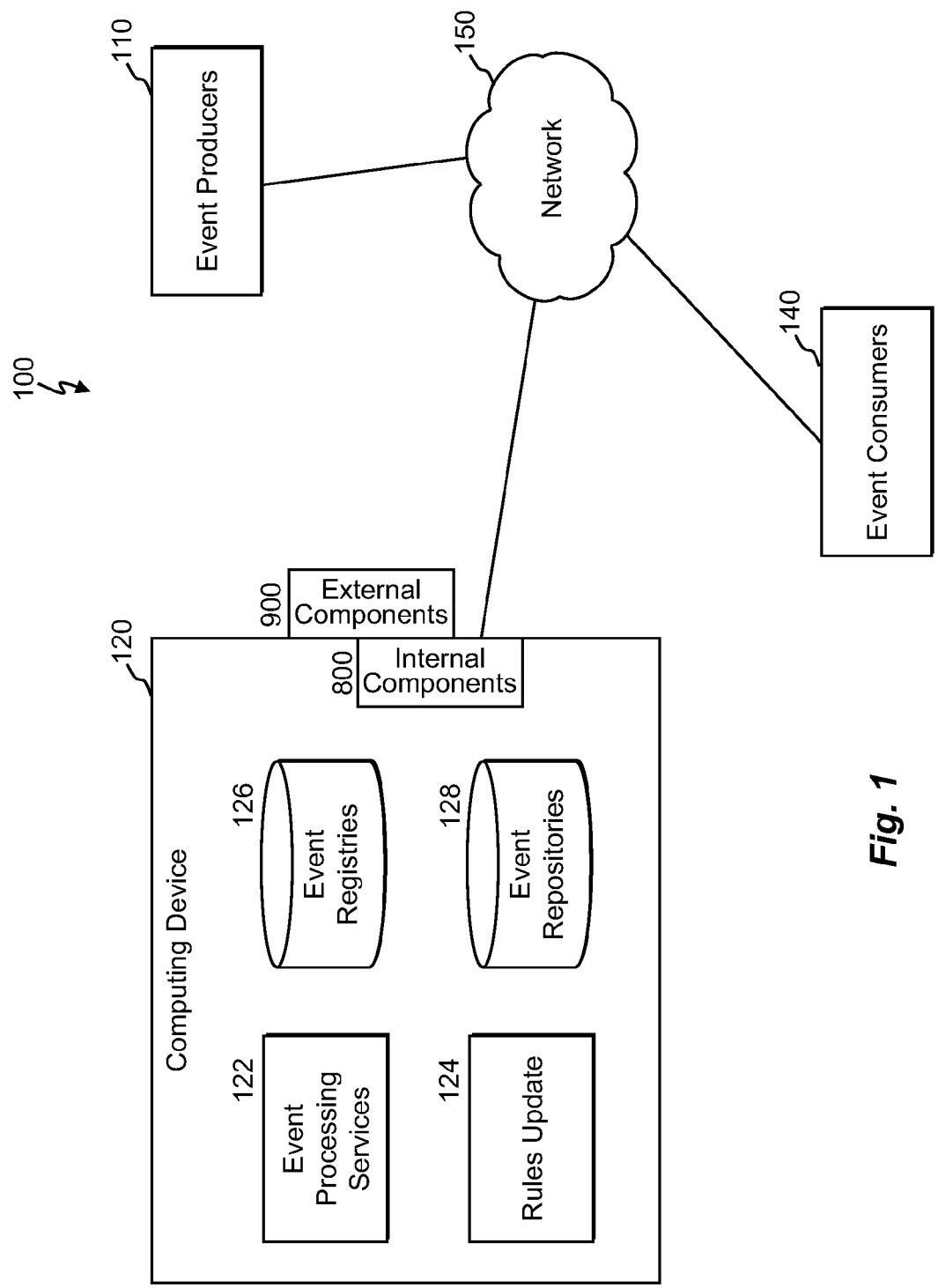
FIG. 1 is a functional block diagram of an event processing system in accordance with an embodiment of the present invention.

FIG. 1 is a functional block diagram illustrating an event processing system 100 in accordance with an embodiment of the present invention. Event processing system 100 includes event producers 110, a computing device 120, event consumers 140, all interconnected over a network 150.

In a preferred embodiment, computing device 120 includes event processing services program 122, rules update program 124, event registries 126, and event repositories 128. Computing device 120 also includes internal hardware components 800 and external hardware components 900. In preferred embodiments of the present invention, computing device 120 can be a laptop, tablet, or netbook personal computer (PC), a desktop computer, a mainframe or mini computer, a personal digital assistant (PDA) such as a Blackberry®, or a smart phone. In general, computing device 120 can be any programmable electronic device as described in further detail with respect to FIG. 7.

Figure 2:
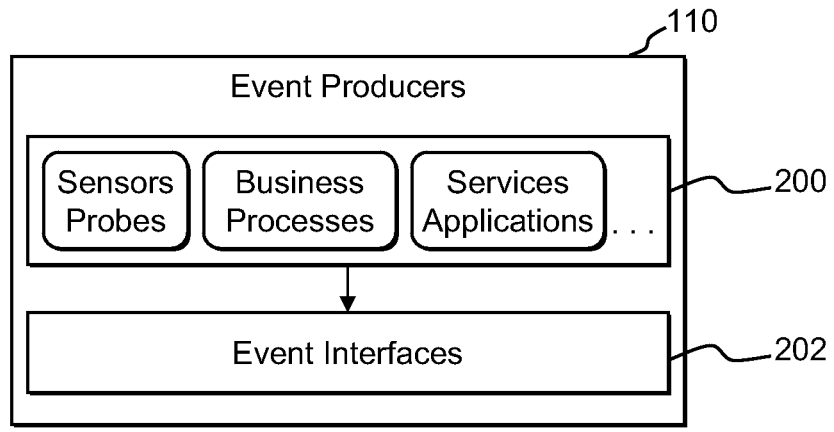
FIG. 2 is a functional block diagram of event producers in accordance with an embodiment of the present invention.

FIG. 2 is a functional block diagram of event producers 110 in accordance with an embodiment of the present invention. Event producers 110 includes producing agents 200 and event interfaces 202. Producing agents 200 are the real-world devices, processes, services, and applications that produce input events. In general, producing agents 200 can be any device, process, etc., in the real-world that generates an event of interest. As illustrated, examples of producing agents can include sensors and probes to measure or detect physical properties such as heat, light, sound, pressure, speed, magnetic flux, voltage, chemicals, etc. Producing agents 200 might include business processes that produce, for example, orders, sales figures, shipments, budget numbers, employee demographics, etc. Producing agents 200 might also include services and applications that run on a computer and produce, for example, notifications of hardware errors or packet failures, etc.

Producing agents 200 do not always produce input events in the format desired by downstream entities. Event interfaces 202 receive input events from producing agents 200 and format the input events into the desired output formats. For example, input events from sensors and probes might be formatted into decimal format and a timestamp added. Event interfaces 202 might also do some modest processing, such as filtering and aggregation. In the preferred embodiment, event interfaces 202 route input events to event processing services 122. In general, event interfaces 202 perform formatting functions on input events as necessary, and route the input events to the desired destinations. Each input event could be formatted differently for different destinations, and each input event could be routed to multiple destinations.

Figure 3:
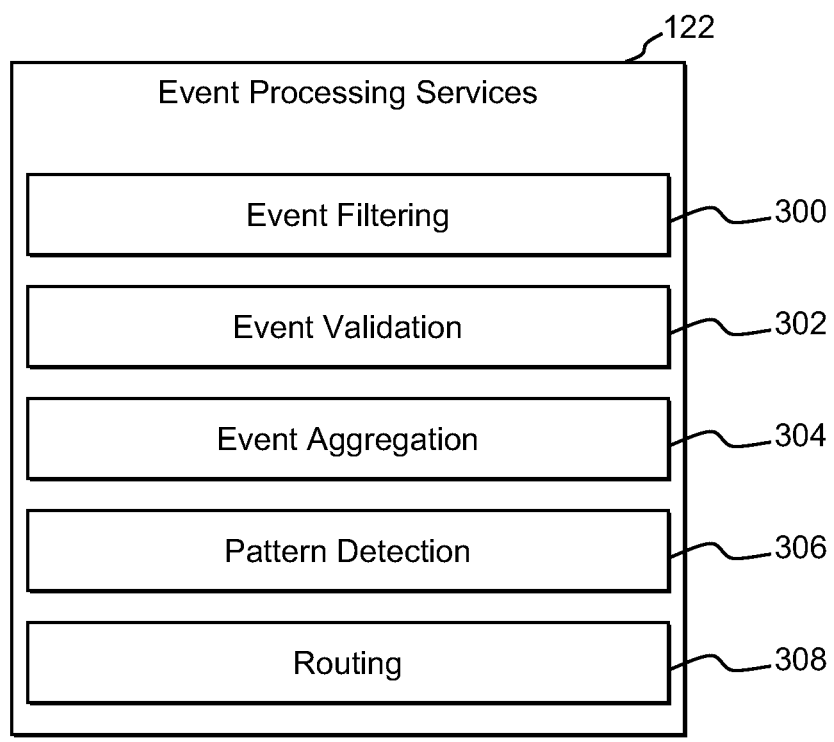
FIG. 3 is a functional block diagram of an event processing services program in accordance with an embodiment of the present invention.

FIG. 3 is a functional block diagram of an event processing services program 122 in accordance with an embodiment of the present invention. Event processing services program 122 receives the input events generated by event producers 110. In a preferred embodiment, event processing services program 122 includes event filtering module 300, event validation module 302, event aggregation module 304, pattern detection module 306, and routing module 308.

Event filtering module 300 receives input events from event producers 110 and performs a filtering function on the received input events to accept only those input events that will be processed by pattern detection module 306. Event validation module 302 receives the input events passed by filtering module 300 to confirm that the information contained in the input events is valid. For example, event validation module 302 might confirm that numeric fields in an input event record are within the specified range, that a Boolean True/False field contains either a "True" or a "False," etc. Event filtering module 300 and event validation module 302 make use of event registries 126, which contain information on known input event types, record layouts, valid field values and ranges, etc.

Event aggregation module 304 operates to group information from input events. For example, pattern detection module 306 might process information relating to the start and stop times of a real-world event. Event aggregation module 304 would use event repositories 128 to store the event start time input event, and then combine the start time information with the event stop time from the associated event stop time input event. This aggregated information would then be sent to pattern detection module 306. In another example, event processing services 122 might process a certain input event type based on input event occurrences during a fixed time interval. Event aggregation module 304 would store the relevant input events in event repositories 128 over the time interval, and aggregate the results for pattern detection module 306 to process.

Pattern detection module 306 processes input events sent by event filtering module 300, event validation module 302, and event aggregation module 304. The input events are processed in accordance with a set of rules, which may include one or more condition rule statements and action rule statements. A condition rule statement instructs pattern detection module 306 what to look for in the input events and how the input event should be classified. Table 1 shows an example of a condition rule in pseudo-code. Four conditions in the input event are tested, and a Boolean variable Rule__1_ Value is set to True or False depending on whether a condition rule statement was satisfied. In this example, the condition rule is an ordered list of condition tests, and the input event is classified based on the first condition test that is satisfied. A default value for Rule__1_ Value is set by the last statement in the rule. This default value is applied if none of the condition rule statements are satisfied. In general, pattern detection module 306 can perform either simple or complex event processing. In a preferred embodiment, the condition rules classify the input events as a Boolean value, indicating a higher or lower likelihood of a correct classification based on the training data and relative to the overall input event stream.

TABLE 1

/* Condition Rule 1 */
If ((Condition 1) Λ (Condition 2)) then Rule__1__Value = True;
else if ((Condition 2) Λ (Condition 3)) then Rule__1__Value = False;
else if (Condition 4) then Rule__1__Value = True;
else Rule__1__Value = True;

An action rule statement instructs pattern detection module 306 what action to take based on the results of the condition rule statements. The action to take depends on the nature of the EPS and can range from a simple notification to the appropriate person or system, to causing, for example, a valve to close in an industrial process. Table 2 shows an example action rule in pseudo-code.

TABLE 2

```
/* Action Rule */
If (Rule_1_Value) == True
    then take Action_1
    else take Action_2;
```

EPS rules are typically developed using a mix of intuition and statistical analysis. Initial rules are often developed based on an understanding of the real-world factors that influence the behaviors of interest. For example, if the behavior of interest is product sales, real-world influencing factors might include advertising channels, product pricing in relation to competitor products, product quality, promotional discounts, etc. If the behavior of interest is fire suppression in a chemical factory, real-world factors might include temperature, smoke, chemical fumes, ventilation, where certain chemicals are stored, location of fire doors, etc. Initial rules can be developed by applying, for example, a regression analysis to historical data to determine the relative importance of identified influencing factors on the behavior of interest. Such historical data is referred to as a training set or training data. Based on an understanding of the relative importance of various factors on influencing the desired behavior, an initial rule set can be developed that will apply certain actions, referred to as output events, to these factors to attempt to drive the behavior in a desired direction.

Rules update module 124 is invoked to update or refine the EPS rules. EPS rule sets are often refined to improve their performance in driving behaviors of interest. For example, changes in real-world conditions may cause changes in the relative importance of the factors that influence the behaviors of interest. In another example, there may not have been sufficient initial training data to which to apply a statistical analysis. In these cases, for example, a regression analysis could be run on a recent set of training data to refine the relative weightings of the various factors. Based on these new weightings and other factors, such as, for example, strategic business directions, the EPS rules can be refined to produce a better and more current set of output events to attempt to drive the behavior of interest in a desired direction. Typically, training data comprises output events, including the factors that the EPS rule used to produce the output event. Additional factors that may have an influence on the behavior of interest can also be included in the training data records for later statistical analysis. If possible, the actual effect on the behavior of interest is also included.

In a preferred embodiment, the first rule for pattern detection module 306 is an "intuition" rule that produces an output event having a Boolean value. This would typically be a rule based on the instinct and experience of the EPS user that is designed to accurately classify most of the input events.

After a period of time a training set is collected that comprises a statistically significant number of output events in which the intuition rule caused the output event to have an incorrect Boolean value. That is, a process external to the EPS determines that the intuition rule has in fact incorrectly classified the input event and produced either a false-positive value or a false-negative value in the output event.

For example, an EPS developed to predict financial fraud in stock transactions might have an initial intuition rule similar to the pseudo-code shown in Table 3. The rule is rather simple, and the output event is a Suspicious Activity record to a financial examiner prompting further investigation if a trading client sells stocks within three hours of their purchase in five consecutive transactions. The Suspicious Activity record would include the details of the transactions that caused the condition rule to find a match.

TABLE 3

```
/* Condition Rule 1 */
If Client sells stocks within 3 hours of buying for
5 consecutive transactions
    then Possible_Fraud_Value = True
    else Possible_Fraud_Value = False;
//
/* Action Rule */
If (Possible_Fraud_Value) == True
    then output Suspicious Activity record;
    else exit;
```

As an initial EPS rule, this intuition rule can be used immediately. However, the accuracy in predicting financial fraud may be rather low. After the financial examiner has conducted the follow-on investigation to determine if fraud actually occurred, a case disposition is added to the Suspicious Activity record, in particular indicating whether the Suspicious Activity record resulted in a false-positive. In addition, false-negative records are created for which fraud was found but was not captured by the rule, and for which quick buying and selling of stocks was a factor.

In a preferred embodiment, after a sufficient number of false-negative and false-positive records are collected, these records are used as training data to establish additional rules. A separate statistical analysis is applied to the set of false-negative records and the set of false-positive records. In general, for a rule set involving multiple factors, the factor values for each of the two sets should form patterns that cluster around certain values. These patterns can be detected through a statistical analysis and are then used to create a new pair of rules—one derived from the false-positive records and one derived from the false-negative records. This new pair of rules is then added to the EPS rule set. Periodically, a new training set comprising false-positive and false-negative records is then collected based on the amended rule set, and an additional new rule pair is created and added to the rule set.

In a preferred embodiment, the training data comprising the false-positive and false-negative records is processed through a statistical modeling package, such as IBM SPSS Modeler version 14.2. IBM and SPSS are registered trademarks of International Business Machines Corporation. For example, using IBM SPSS Modeler version 14.2, all factors included in the training data are defined as "input" type fields, and the Boolean rule output value is defined as a "target" type field. The input fields are further defined as to the type of field, such as continuous value, integer, Boolean, etc. The training data is then analyzed using, for example, the Decision List model. The IBM SPSS Modeler will generate a rule set based on the input factors that can be used to identify those input events that are most likely to be classified as false-positive and false-negative. This rule set is then added to the existing rules. While an embodiment using IBM SPSS Modeler is described, there are many other statistical modeling packages available in the marketplace that can also be used.

In a preferred embodiment, input events are processed beginning with the newest rule pair down to the initial intuition rule, and the input event is classified based on the first condition rule statement that is satisfied. An example of how this aspect might be implemented is indicated by pseudo-code in Table 4, shown below.

Routing module 308 directs the output events to the appropriate event consumers 140 via network 150. As mentioned above, different output events may be directed to different event consumers, and an event output may be directed to multiple event consumers.

Figure 4:
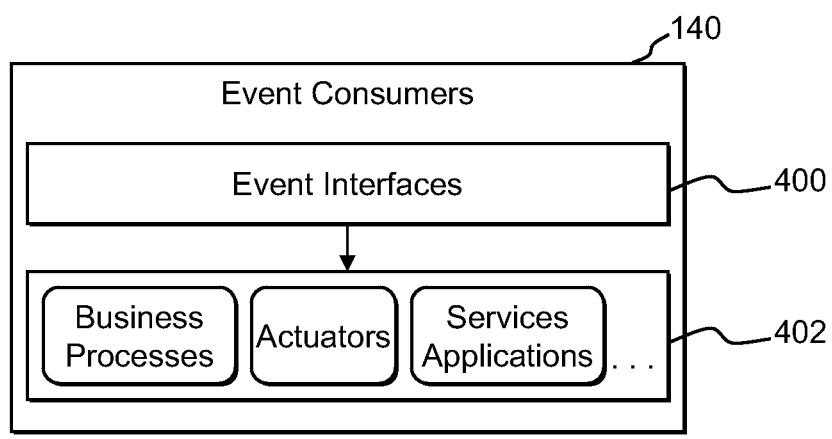
FIG. 4 is a functional block diagram of event consumers in accordance with an embodiment of the present invention.

FIG. 4 is a functional block diagram of event consumers 140 in accordance with an embodiment of the present invention. Event consumers 140 includes event consumer agents 402 and event interfaces 400. Event consumer agents 402 perform tasks in reaction to receiving an output event. Similar to producing agents 200, event consumer agents 402 are real-world devices, processes, services, and applications that react to output events received from event processing services 122. In general, event consumer agents 402 can be any device, process, etc. in the real-world that reacts to an output event produced by an EPS. As illustrated, event consumer agents 402 can include business process, actuators that control various physical devices in industrial processes, and services and applications that run on a computer.

TABLE 4

Example Rule Statement for Processing False-Negative/False-Positive Rules

| Pseudo-code Statements | Comments |
|---|---|
| /* Condition Rule Statement */ | |
| Set false-negative-identification-rule(0) = False; | New pairs of false-negative/false-positive rules begin with index value 1. |
| Set false-positive-identification-rule(0) = False; | |
| Set n = False; | |
| Set p = False; | |
| For i = N down to 0 do; | Apply each new pair of false-negative/false-positive rules to the input event in reverse order using newest rule pair first. On first match of a false-negative or false-positive rule, set an indicator and break out of loop. If no false-negative/false-positive rules, skip this For-loop. |
|   If (false-negative-identification-rule(i)) then | |
|     set n = True; | |
|     break out For loop; | |
|   endif; | |
|   If (false-positive-identification-rule(i)) then | |
|     set p = True; | |
|     break out For loop; | |
|   endif; | |
| endFor; | |
| // | |
| /* Action Rule Statement */ | |
| If (n == true) then | If a false-negative rule was matched, then do Action 1, the initial rule "match" action. |
|   take Action_1; | |
| else if (p == true) then; | If a false-positive rule was matched, then do Action 2, the initial rule "no-match" action. |
|   take Action_2; | |
| else if (initial_rule == true) then | If no false-negative or false-positive rules are matched, apply the initial "instinct" rule to the input event. |
|   take Action_1 | |
| else take Action_2; | |

Event processing services 122 does not always produce output events in the format desired by event consumer agents 402. Event interfaces 400 receive output events from event processing services 122 and formats the output events into desired formats. For example, event processing services 122 might transmit certain output events in a common format to all event consumers 140. Event interfaces 400 would, for example, format the output events in accordance to the specific requirements for each event consumer agent 402. Event interfaces 400 might also do some modest processing, such as filtering and aggregation. In the preferred embodiment, event interfaces 400 routes output events to the proper event consumer agent 402. In general, event interfaces 400 perform formatting functions on output events as necessary, and routes the output events to the proper event consumer agent. Each output event could be formatted differently for different event consumer agents, and each output event could be routed to multiple event consumer agents.

Network 150 interconnects event producers 110, computing device 120, and event consumers 140. Network 150 can be, for example, a local area network (LAN), a wide area network (WAN) such as the Internet, or a combination of the two, and include wired, wireless, or fiber optic connections. In general, network 150 can be any combination of connections and protocols that will support communications event producers 110, computing device 120, and event consumers 140 in accordance with a desired embodiment of the invention.

Figure 5:
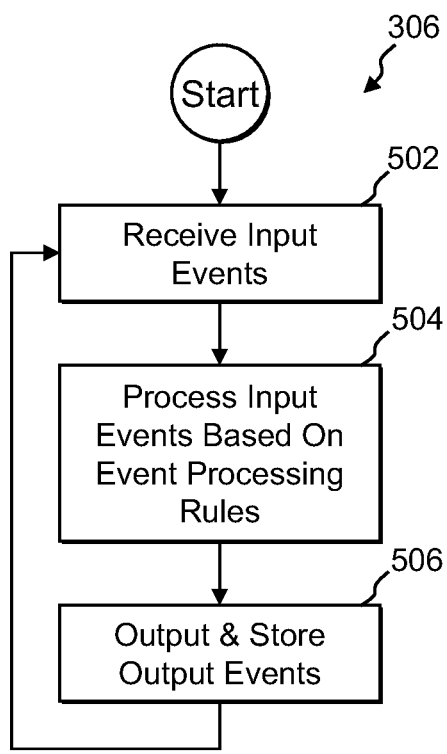
FIG. 5 is a flowchart illustrating the steps of an aspect of an event processing services program in accordance with an embodiment of the present invention.

FIG. 5 is a flowchart illustrating the general steps performed by pattern detection module 306 of event processing services program 122 in accordance with an embodiment of the present invention. Pattern detection module 306 receives input events that are passed by event filtering module 300, event validation module 302, and event aggregation module 304 (step 502).

Each input event is then processed in accordance with a set of rules (step 504) that detect patterns in the input events, and classify the input events as a Boolean value. An output event is then generated based on the classification of the input event. The output event is then sent (step 506) to routing module 308 for transmission to event consumers 140 via network 150. The output event is also stored in event repositories 128 for later use, for example as training data to refine the rules used by pattern detection module 306. After an output event is generated and sent (step 506), pattern detection module awaits the next input event (step 502).

Figure 6:
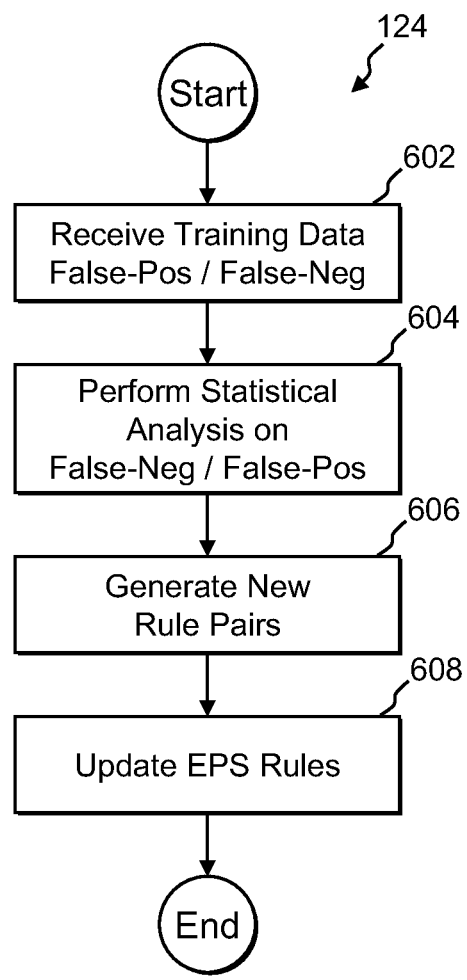
FIG. 6 is a flowchart illustrating the steps of an aspect of a rules update program in accordance with an embodiment of the present invention.

FIG. 6 is a flowchart illustrating the general steps performed by rules update module 124 in accordance with an embodiment of the present invention. After a period of time a training set is collected that comprises a statistically significant number of output events in which the EPS rule set has caused the output event to have an incorrect Boolean classification value. That is, a process external to the EPS determines that the rule set has in fact incorrectly classified the input event and produced either a false-positive or false-negative classification value in the output event. The training data records comprise output events, including the factors that the EPS rule used to produce the output event. If possible, the actual effect on the behavior of interest is also included. The training records are processed by rules update module 124 at step 602. A separate statistical analysis is performed on the false-negative training records and the false-positive training records (step 604) to identify underlying patterns in the factors of the two sets of records. As described above in relation to rules update module 124, a statistical modeling package, such as IBM SPSS Modeler version 14.2 can be used to perform the analysis and generate a new rule set. Based on the statistical analysis, a new pair of EPS rules is generated—one each for the two sets of records (step 606). The EPS rule set is then updated with the new rule pair (step 608).

Figure 7:
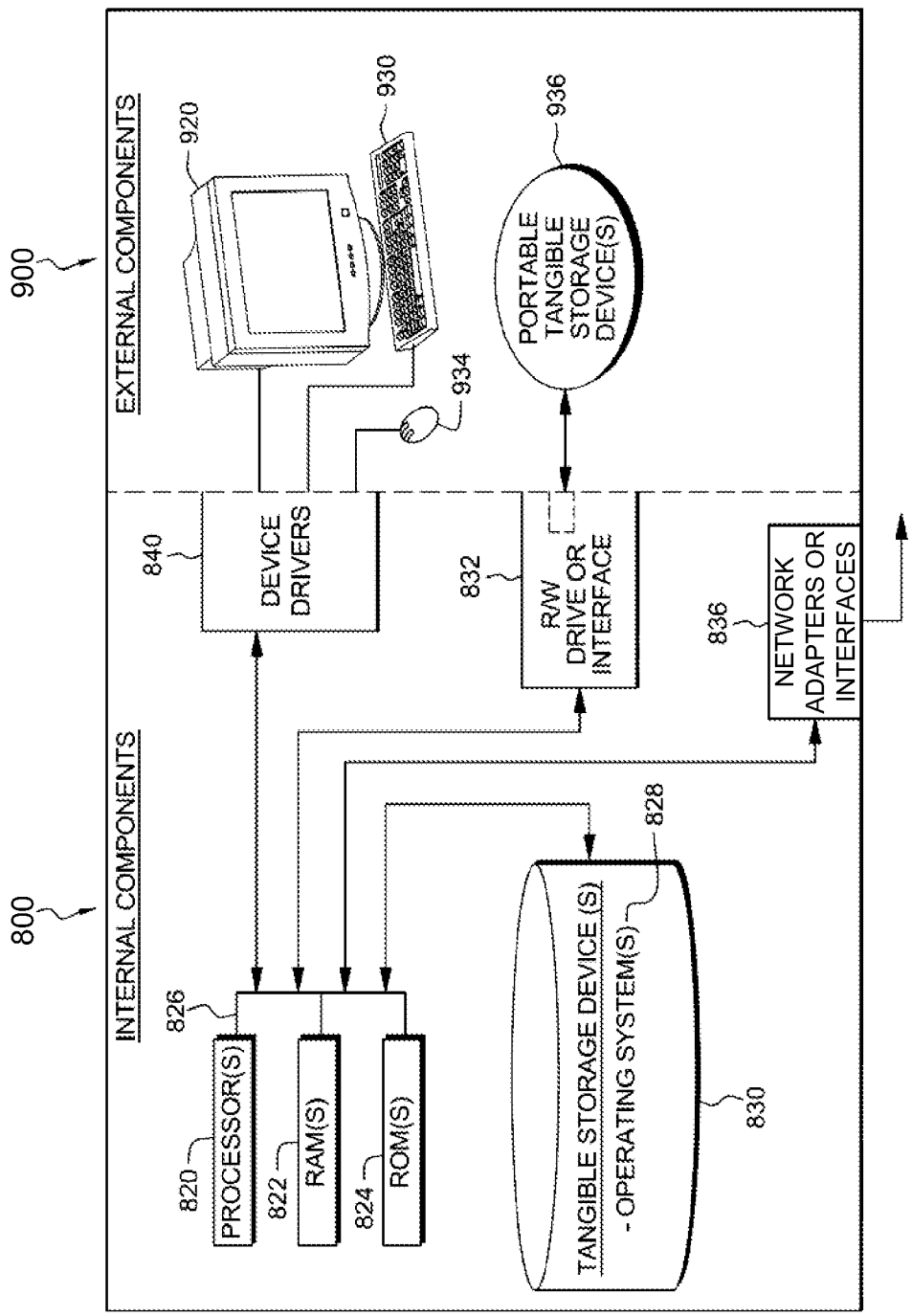
FIG. 7 is a block diagram of hardware and software within the computing device of FIG. 1 in accordance with an embodiment of the present invention.

FIG. 7 shows a block diagram of the components of a data processing system 800, 900, such as computing device 120, in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed systems and cloud computing environments that include any of the above systems or devices.

Computing device 120 includes internal components 800 and external components 900 illustrated in FIG. 7. Internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 122 and 124 in computing device 120 are stored on one or more of the computer-readable tangible storage devices 830 for execution by one or more of the processors 820 via one or more of the RAMs 822 (which typically include cache memory). Event registries 126 and event repositories 128 are also stored on one or more of the computer-readable tangible storage devices 830. In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 122 and 124 in computing device 120 can be stored on one or more of the portable computer-readable tangible storage devices 936, read via the respective R/W drive or interface 832 and loaded into the respective hard drive 830.

Internal components 800 also includes network adapters or interfaces 836 such as a TCP/IP adapter cards, wireless wi-fi interface cards, or 3G or 4G wireless interface cards or other wired or wireless communication links. The programs 122 and 124 in computing device 120 can be downloaded to user computer 120 from an external computer via a network (for example, the Internet, a local area network or other, wide area network) and network adapters or interfaces 836. From the network adapters or interfaces 836, the programs 122 and 124 in computing device 120 are loaded into the hard drive 830. The network may comprise copper wires, optical fibers, wireless transmission, routers, firewalls, switches, gateway computers and/or edge servers.

External components 900 can include a computer display monitor 920, a keyboard 930, and a computer mouse 934. External components 900 can also include touch screens, virtual keyboards, touch pads, pointing devices, and other human interface devices. Internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method for processing events, the method comprising the steps of:

a computer receiving a plurality of input events, each input event comprising one or more factors;

the computer processing each of the plurality of input events based on at least a first event processing rule wherein the at least first processing rule causes the computer to evaluate the one or more factors, and based on a result of the evaluation, assigning each of the plurality of input events a Boolean output value;

the computer generating an output event containing the one or more factors and the Boolean output value; and the computer generating a pair of additional event processing rules based on output events for which the at least first event processing rule caused the output events to have a false-negative or false-positive Boolean output value, the additional rules to be included in the at least first event processing rule, wherein one of the pair of rules is derived by the computer from output events having a false-negative Boolean output value and the other of the pair of rules is derived by the computer from output events having a false-positive Boolean output value.

2. A method in accordance with claim 1, wherein the step of generating additional event processing rules is periodically repeated.

3. A method in accordance with claim 1, wherein the at least first event processing rule is an ordered list of rules ordered by newest rule first, and the step of processing further comprises the computer assigning the input event a Boolean output value based on the first rule of the ordered list of rules satisfied by the one or more factors of the input event.

4. A method in accordance with claim 1, wherein the step of processing further comprises the steps of:
the computer filtering the plurality of input events;
the computer validating the plurality of input events;
the computer aggregating the plurality of input events; and
the computer detecting patterns in the plurality of input events.

5. A computer program product to process events, the computer program product comprising:
one or more computer-readable storage devices and program instructions stored on at least one of the one or more tangible storage devices, the program instructions comprising:
program instructions to cause a computer to receive a plurality of input events, each input event comprising one or more factors;
program instructions to process each of the plurality of inputs events based on at least a first event processing rule wherein the at least first processing rule causes the computer to evaluate the one or more factors, and based on a result of the evaluation, assigning each of the plurality of input events a Boolean output value;
program instructions to generate an output event containing the one or more factors and the Boolean output value; and
program instructions to generate a pair of additional event processing rules based on output events for which the at least first event processing rule caused the output events to have a false-negative or false-positive Boolean output value, the additional rules to be included in the at least first event processing rule, wherein one of the pair of rules is derived from the events having a false-negative Boolean output value and the other of the pair of rules is derived from the events having a false-positive Boolean output value.

6. A computer program product in accordance with claim 5, wherein the program instructions to generate additional event processing rules are periodically repeated.

7. A computer program product in accordance with claim 5, wherein the at least first event processing rule is an ordered list of rules ordered by newest rule first, and the program instructions to process further comprises program instructions to assign the input event a Boolean output value based on the first rule of the ordered list of rules satisfied by the one or more factors of the input event.

8. A computer program product in accordance with claim 5, wherein the program instructions to process further comprise:
program instructions to filter the plurality of input events;
program instructions to validate the plurality of input events;
program instructions to aggregate the plurality of input events; and
program instructions to detect patterns in the plurality of input events.

9. A computer system to process events, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to cause a computer to receive a plurality of input events, each input event comprising one or more factors;
program instructions to process each of the plurality of inputs events based on at least a first event processing rule wherein the at least first processing rule causes the computer to evaluate the one or more factors, and based on a result of the evaluation, assigning each of the plurality of input events a Boolean output value;
program instructions to generate an output event containing the one or more factors and the Boolean output value; and
program instructions to generate a pair of additional event processing rules based on output events for which the at least first event processing rule caused the output events to have a false-negative or false-positive Boolean output value, the additional rules to be included in the at least first event processing rule, wherein the program instructions to generate additional event processing rules further comprise program instruction to generate a pair of rules wherein one of the pair of rules is derived from the events having a false-negative Boolean output value and the other of the pair of rules is derived from the events having a false-positive Boolean output value.

10. A computer system in accordance with claim 9, wherein the program instructions to generate additional event processing rules are periodically repeated.

11. A computer system in accordance with claim 9, wherein the at least first event processing rule is an ordered list of rules ordered by newest rule first, and the program instructions to process further comprises program instructions to assign the input event a Boolean output value based on the first rule of the ordered list of rules satisfied by the one or more factors of the input event.

12. A computer system in accordance with claim 9, wherein the program instructions to process further comprise:
program instructions to filter the plurality of input events;
program instructions to validate the plurality of input events;

program instructions to aggregate the plurality of input events; and program instructions to detect patterns in the plurality of input events.

* * * * *